United States Patent [19]
Rasmussen et al.

[11] Patent Number: 5,744,711
[45] Date of Patent: Apr. 28, 1998

[54] WINTER PRECIPITATION MEASURING SYSTEM

[75] Inventors: Roy Martin Rasmussen, Boulder, Colo.; John Hallett, Reno, Nev.

[73] Assignees: University Corporation for Atmospheric Research, Boulder, Colo.; University and Community College System of Nevada, on behalf of Desert Research Institute, Reno, Nev.

[21] Appl. No.: 740,757

[22] Filed: Nov. 1, 1996

[51] Int. Cl.[6] .................................................. G01W 1/14
[52] U.S. Cl. .......................... 73/170.21; 73/170.19; 364/420
[58] Field of Search .................. 73/170.17, 170.18, 73/170.19, 170.2, 204.18, 204.19; 364/420

[56] References Cited

U.S. PATENT DOCUMENTS

| | | | |
|---|---|---|---|
| 3,141,330 | 7/1964 | Murray et al. | 73/170.17 |
| 3,428,890 | 2/1969 | Peck et al. | 73/170.19 |
| 3,472,088 | 10/1969 | Ojard | 73/170.19 |
| 4,893,506 | 1/1990 | Shyu et al. | 364/420 |
| 5,016,196 | 5/1991 | Nelson et al. | 364/420 |
| 5,528,224 | 6/1996 | Wang | 73/170.17 |

FOREIGN PATENT DOCUMENTS 59-210390  11/1984  Japan ............................. 73/170.17

*Primary Examiner*—Ronald L. Biegel
*Attorney, Agent, or Firm*—Duft, Graziano & Forest, P.C.

[57] ABSTRACT

A winter precipitation measuring system for quantifying the precipitation rate of winter precipitation at a given point on the Earth's surface. The winter precipitation measuring system includes an elongated tube, a thermal plate within the elongated tube, and a method and apparatus for maintaining the thermal plate at a substantially constant temperature relative to a reference plate and for determining a precipitation rate in response to the difference in power consumption required to maintain the thermal plate at a substantially constant temperature.

17 Claims, 5 Drawing Sheets

WINTER PRECIPITATION MEASURING SYSTEM

Government Funded Invention

This invention was made with Government support under Agreement No. ATM-9209181 awarded by the National Science Foundation. The Government has certain rights in this invention

FIELD OF THE INVENTION

This invention relates to the field of meteorological instrumentation, and more particularly to a system for quantifying the liquid equivalent of winter precipitation that reaches the Earth's surface and at what rate the winter precipitation reaches the Earth's surface.

PROBLEM

A snow gauge is the common name for a device designed to quantify the liquid equivalent of winter precipitation that reaches the Earth's surface at a given point on the Earth's surface. For purposes of this document, winter precipitation includes frozen precipitation and supercooled precipitation including, but not limited to, snow, freezing drizzle, and supercooled drizzle. Existing snow gauges, however, rely on an inherently inaccurate technique of collecting and melting winter precipitation, and weighing the melted precipitation to estimate a total accumulation over time. The weighing type snow gauge accumulates winter precipitation in an accumulation container as the winter precipitation free-falls into the accumulation container. Ideally, the winter precipitation free-falls into the accumulation container at the same rate and in the same quantity as the winter precipitation would fall in the immediate snow gauge vicinity. The accumulation container is charged with chemicals such as an anti-freeze solution made of ethylene glycol or a mixture of glycol and methanol, or any similarly functioning solution, to dissolve the winter precipitation and to prevent the liquefied sample contents of the accumulation container from refreezing. A layer of oil on the surface of the anti-freeze solution helps retard evaporation of the anti-freeze and any liquid collection sample within the accumulation container. The weight of the liquid collection sample is converted into a corresponding depth measurement so that the total accumulation of precipitation and the precipitation rate are estimated over time. Measurement resolutions of at or about 0.2 mm are achievable using a weighing-type snow gauge. Weighing type snow gauges available in the industry include, but are not limited to, the Universal gauge by Belfort, and the ETI gauge by Electronics Techniques Incorporated. The Universal gauge is the preferred snow gauge and the gauge used by the United States National Weather Service (NWS).

One problem with a weighing type snow gauge is that the overall accuracy of the gauge is limited to mechanical resolutions of accumulation. Therefore, a light winter precipitation event of at or about 10 mm of accumulation per hour or less, for example, can go completely undetected or there may be substantial time delays between accumulation reports during such an event. In either circumstance, existing snow gauges are unable to reliably and accurately report real-time accumulation for such light precipitation events.

Another related problem with a weighing type snow gauge is that even during a heavy winter precipitation event, there is a time delay between the time winter precipitation falls and the snow gauge detects or "tips" under the weight of a measurable accumulation of the winter precipitation. The time delay can be from a few minutes to 30 minutes or more, thereby making it difficult to accurately determine a real-time precipitation rate.

Another problem with a weighing type snow gauge is that wind induced measurement errors occur due to wind gusts that vibrate or sway the snow gauge and/or the accumulation container in the snow gauge. Although the snow gauge housing can be reenforced to withstand wind gusts without vibrating or swaying, the advantage gained by reenforcing is outweighed by the additional materials and manufacturing cost. Even if the snow gauge housing is reenforced, the sensitivity of the accumulation container inside the housing remains subject to vibration and/or jostling due to wind gusts flowing through the substantially hollow snow gauge housing.

Another problem with weighing type snowgauges is the accumulation of snowfall on the inner sidewalls of the gauge. This inner sidewall accumulation inhibits true real-time recording of actual precipitation reaching the Earth's surface to an extent that the recorded precipitation rate is as much as 70% less than the actual precipitation rate.

Another problem with weighing snowgauges is that they can not distinguish between types of precipitation that can exist at temperatures near or below zero. An example of the types of precipitation that can exist at temperatures near or below zero are snow and drizzle.

Due to the problems with weighing-type snow gauges discussed above, a high-accuracy low cost snow gauge is desirable that quantifies a liquid equivalent of the winter precipitation in true real-time at resolutions about or considerably less than 0.2 mm of accumulation. A snow gauge of the desired type has heretofore not been realized prior to the invention disclosed and claimed below.

SOLUTION

The above identified problems are solved and an advance achieved in the field by the winter precipitation measuring system of the present invention. The winter precipitation measuring system is an unattended system that quantifies a liquid equivalent of winter precipitation such as snow or drizzle as previously defined in true real-time without requiring a chemically charged collection container or other mechanically active components. The winter precipitation measuring system includes an elongated tube, a thermal plate within the elongated tube, and a method and apparatus for maintaining the thermal plate at a substantially constant temperature, and determining a precipitation rate in response to maintaining the thermal plate at a substantially constant temperature. Maintaining the thermal plate at a substantially constant temperature includes a method and apparatus for sensing a temperature of the thermal plate, and adjusting an amount of power to the thermal plate in response to the sensing. Determining a precipitation rate includes a method and apparatus for quantifying an amount of current required to maintain the thermal plate at said substantially constant temperature, and converting the amount of current to a precipitation rate. Determining whether the winter precipitation type, such as between snow or drizzle, includes a method for analyzing power rise rates due to individual particles of winter precipitation that contact the thermal plate.

DETAILED DESCRIPTION

Figure 1:
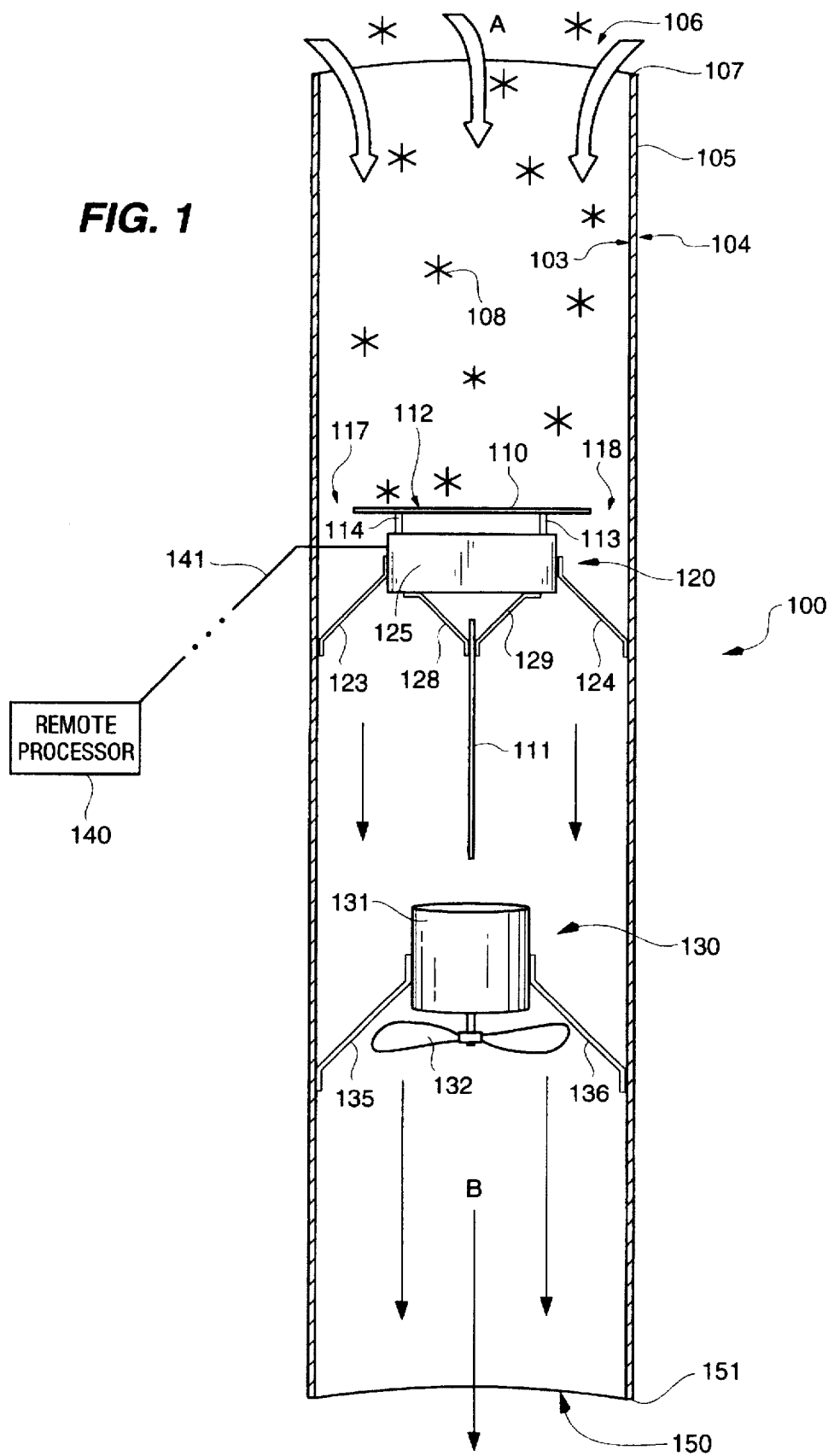
FIG. 1 illustrates an elevational perspective of a winter precipitation measuring apparatus of the present invention in block diagram form.
Figure 2:
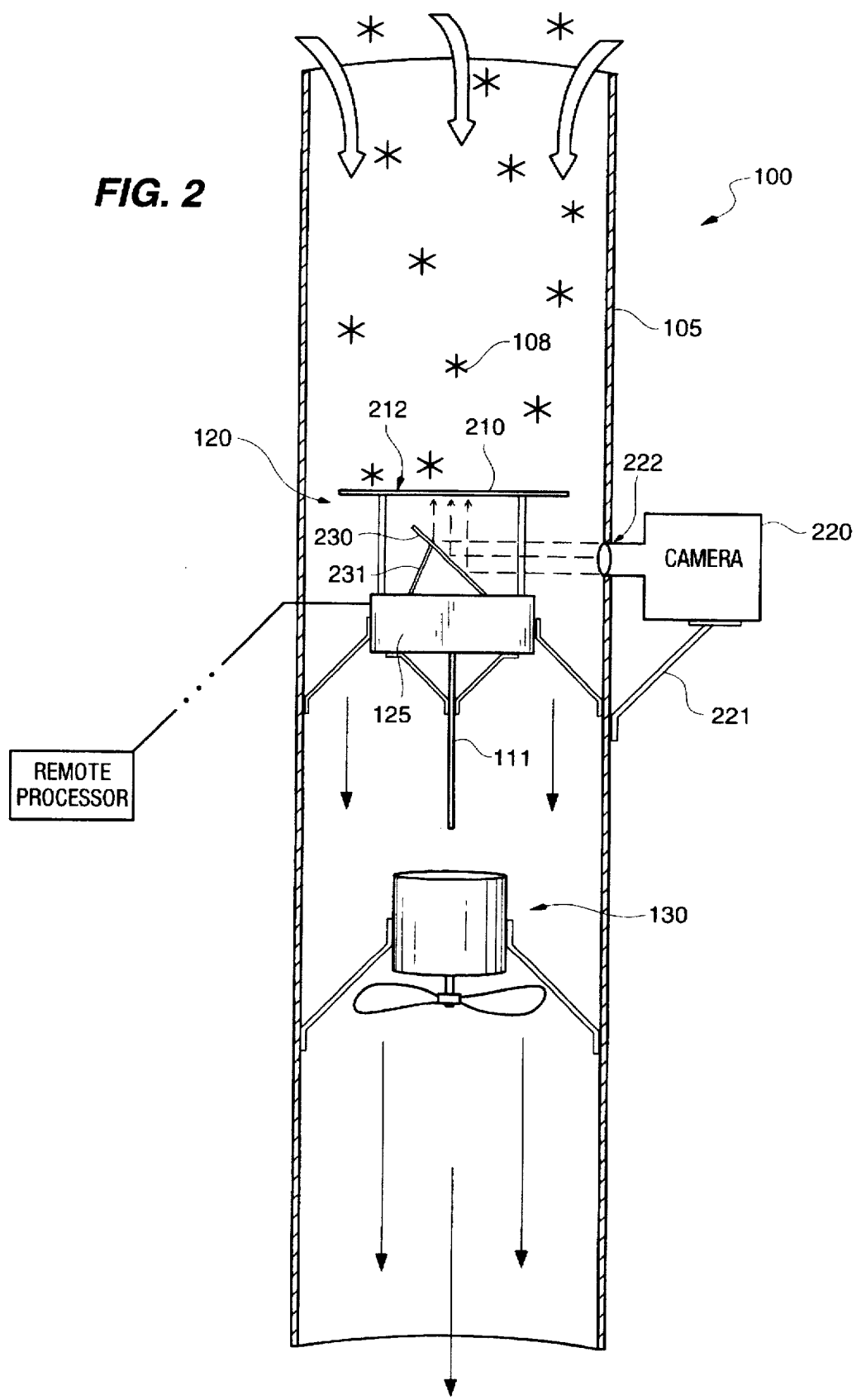
FIG. 2 illustrates an alternative embodiment of a winter precipitation measuring apparatus having a camera attachment.

Winter Precipitation Measuring Apparatus—FIGS. 1–2

FIG. I illustrates an elevational perspective of a winter precipitation measuring apparatus 100 used in the winter precipitation measuring system. Winter precipitation measuring apparatus 100 is an elongated tube 105 having an inner surface 103, an outer surface 104, a first orifice 106 at a first end 107, and a second orifice 150 at a second end 151 wherein the second end 151 is remote from the first end 107. The elongated tube 105 contains sensor electronics assembly 120 and a fan assembly 130 therein.

Sensor electronics assembly 120 includes a primary thermal plate 110, a sensor control housing 125, a reference plate 111, and a communication link 141 to a remote processor 140. Primary thermal plate 110 is positioned within and substantially perpendicular to elongated tube 105. The sensor control housing 125 contains processing electronics for collecting raw precipitation data. The sensor control housing 125 is positioned under primary thermal plate 110 for protection from external elements. Alternative sensor control housing 125 placements include, but are not limited to, attached to the outer surface 104 of elongated tube 105, operatively connected to the winter precipitation measuring apparatus 100 from a remote location, or any location within or proximate to elongated tube 105 provided that the location does not obstruct winter precipitation 108 from free-falling in direction A into elongated tube 105. Reference plate 111 is located under the sensor control housing 125 for protection from external elements. Alternative reference plate 111 placements and orientations exist provided the reference plate 111 is subject to substantially the same ambient temperature and/or air flow as the primary thermal plate 110 while being protected from contact with winter precipitation 108. An additional aerodynamic fairing may be necessary to further protect reference plate 111 in circumstances where wind, wind gust, or other strong turbulence are continuous and/or extreme enough to compromise the reliability of the reference pate 111 as a true reference. Another alternative is to include redundant reference plates to facilitate a reference comparison. Remote processor 140 collects data from the reference plate 111 and primary thermal plate 110 for subsequent processing.

In one preferred embodiment, elongated tube 105 is oriented substantially perpendicular to the Earth's surface with the first end 107 oriented substantially zenithally. Primary thermal plate 110 is positioned substantially perpendicular relative to the elongated tube 105 in a manner that provides substantially uniform air passages 117–118 between primary thermal plate 110 and the inner surface 103 of the elongated tube 105. The preferred ratio of primary thermal plate 110 size to air passage 117 and 118 size, is 1:1.

Fan assembly 130 is located proximate to the second end 151 of elongated tube 105. Fan assembly 130 includes fan motor 131 and fan 132. Fan motor 131 is attached to the inside surface 103 of elongated tube 105 by brackets 135–136. Power for the electrical components within the winter precipitation measuring apparatus 100 is typically in a remote site, such as at or near the remote processor 140 for example. In one preferred embodiment, airflow through elongated tube 105 is in direction A in said first orifice 106 and out said second orifice 150. In conditions of substantially sustained wind, wind gusts, and/or strong turbulence conditions, a baffle or other shielding may be necessary to restrict air flow through elongated tube 105 in either direction.

In one preferred embodiment, primary thermal plate 110 is mounted on the sensor control housing 125 by mounts 113–114 so that thermal surface 112 is oriented substantially zenithally. Reference plate 111 is suspended from sensor control housing 125 by brackets 128–129 so that reference plate 111 is exposed to the same ambient conditions as primary thermal plate 110 without being subject to contact with winter precipitation 108. Sensor control housing 125 is attached to the inside surface 103 of elongated tube 105 by brackets 123–124.

FIG. 2 illustrates an alternative embodiment of a winter precipitation measuring apparatus 100 of FIG. 1. In FIG. 2 the winter precipitation measuring apparatus 100 includes a fan assembly 130 and a sensor electronics assembly 120 within elongated tube 105 as disclosed in FIG. 1. However, the FIG. 2 embodiment includes a transparent primary thermal plate 210, a mirror 230, and a camera 220. The transparent primary thermal plate 210 is a heating element embedded within a transparent material. The mirror 230 is a standard reflective mirror that faces a camera port 222 and is supported at a predetermined fixed angle by mirror support 231. The camera 220 is mounted at camera port 222 in elongated tube 105. The main body of camera 220 is supported outside elongated tube 105 by camera support 221. By positioning the mirror 230 at the proper angle, camera 220 can view the winter precipitation 108 landing on the exposed surface 212 of transparent thermal plate 210 by way of mirror 230. The ability to view the winter precipitation 108 on exposed surface 212 provides valuable real-time visibility data feedback so that actual events at the measuring apparatus 100 location can be monitored remotely when camera 220 is a video camera.

Figure 3:
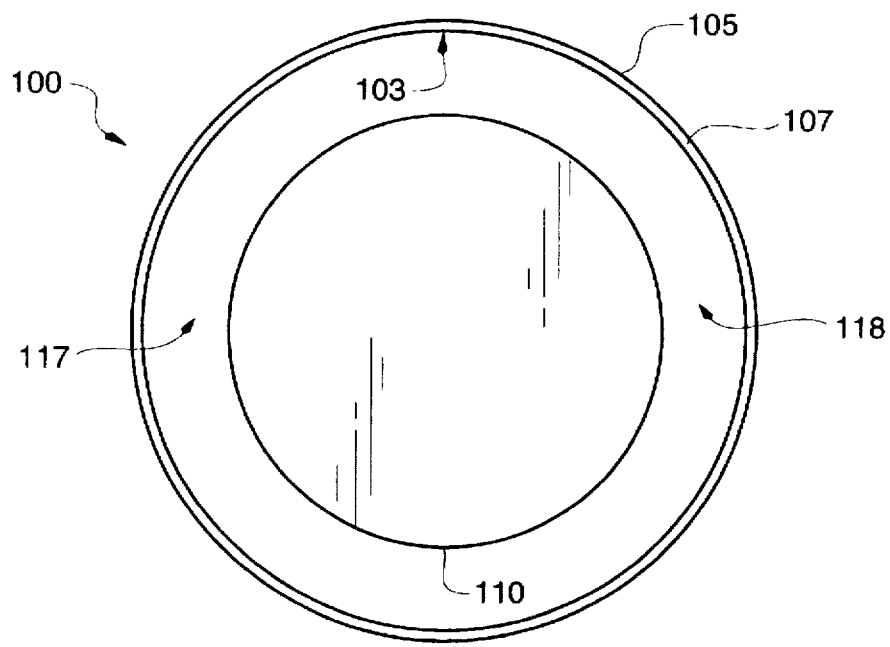
FIG. 3 illustrates a plan view of the winter precipitation measuring apparatus in block diagram form.
Figure 4:
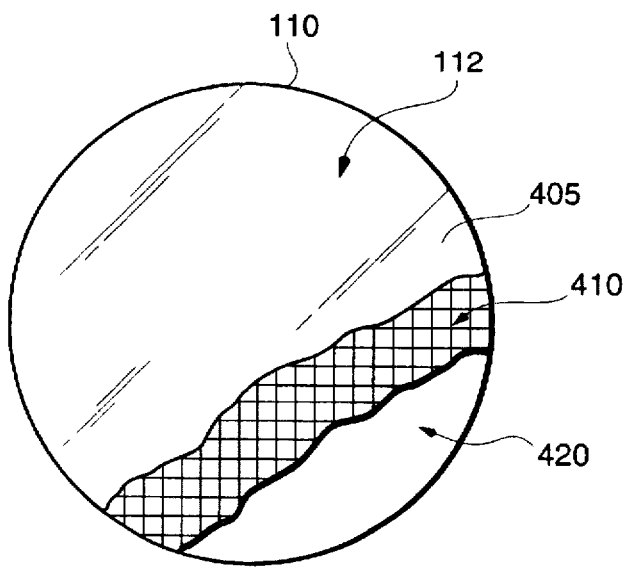
FIG. 4 illustrates a plan view cutaway of a thermal plate.

Thermal Plate Details—FIGS. 3–4

FIG. 3 illustrates the preferred geometric shape of the winter precipitation measuring device 100 and the primary thermal plate 110 when viewed from either first end 107 or second end 151. However, the shape can be any shape in the geometric spectrum of curvilinear to multi-sided provided that the geometric shape provides complete 360° continuity with itself and the primary thermal plate 110 is centered within the walls of inner surface 103 of elongated tube 105 allowing an air passage 117–118. The circular geometric shape of elongated tube is about 20 to 30.5 cm diameter for inner surface 103.

FIG. 4 illustrates a plan view cutaway of primary thermal plate 110. Primary thermal plate 110 and reference plate 111 are identical in their physical construction and are standard among the thermal plates that are readily available in the industry. The geometric shape of primary thermal plate 110 and reference plate 111 can be any shape in the geometric spectrum from curvilinear to multi-sided provided that the geometric shape allows clearance for air passages 117–118 around the entire plate. In the preferred embodiment thermal plate 110 is constructed of materials having a uniformly low thermal capacity in a configuration such as an aluminum substrate 420, a thermal element grid layer 410, and a thermal conductive sealing layer 405.

Figure 5:
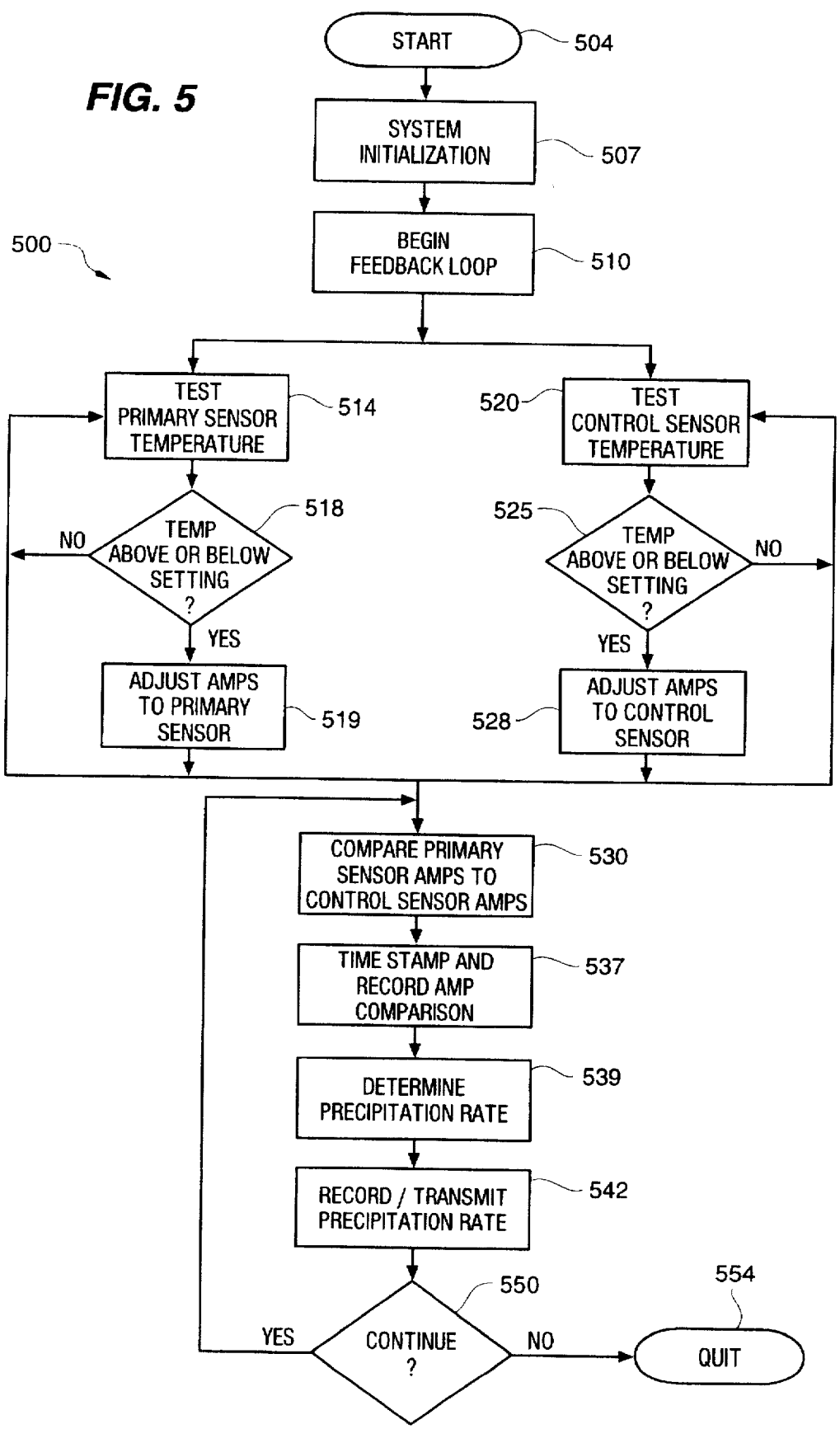
FIG. 5 illustrates operational steps for the winter precipitation measuring system in flow diagram form.

Operational Steps—FIG. 5

FIG. 5 illustrates the operational steps 500 in flow diagram form for the winter precipitation measuring system of the present invention. The system begins at step 504 and proceeds to system initialization at step 507. System initialization 507 includes, but is not limited to, heating primary thermal plate 110 and reference plate 111 to a predetermined operating temperature, and calibrating the primary thermal plate 110 with the reference plate 111. The optimal operating temperature for primary thermal plate 110 and reference plate 111 is below the local boiling point of water yet hot enough to evaporate the winter precipitation substantially instantaneously, where substantially instantaneously can be as much as 5-10 seconds. The operating temperature is programmable and adjustable depending on critical operating conditions that include, but are not limited to, precipitation rate, ambient temperature, humidity, and crystal size. For example, small crystal sizes evaporate more quickly than large crystal sizes falling at the same rate so that the operating temperature can be lower for small crystal sizes.

System initialization at step 507 also includes powering up fan motor 131 to a speed so that fan 132 pulls air in direction B past primary thermal plate 110 and out the second orifice 150. Fan 132 must draw enough air past primary thermal plate 110 so that a convecting heat plume does not develop at or above the first orifice 106 thereby preventing winter precipitation from entering and striking primary thermal plate 110. An additional purpose of the fan 132 is to impose a uniform air flow velocity in direction B past sensor electronics assembly 120.

When primary thermal plate 110 and reference plate 111 are at an optimal operating temperature for present conditions, a continuous cycle begins for both thermal plates. The temperature of the primary thermal plate 110 is tested at step 514. If the temperature is above or below an ideal predetermined temperature setting at decision step 518 then the current to the primary thermal plate 110 is adjusted accordingly at step 519 to maintain the ideal predetermined temperature and processing continues at step 514. If the temperature is at the ideal predetermined temperature setting at decision step 518 then processing continues at step 514.

Substantially concurrently with the continuous process of steps 514, 518, and 519, the temperature of the reference plate 111 is tested at step 520. If the temperature is above or below an ideal predetermined temperature setting at decision step 525 then the current to the reference plate 111 is adjusted accordingly at step 528 to maintain the ideal predetermined temperature and processing continues at step 520. If the temperature is at the ideal predetermined temperature setting at decision step 525 then processing continues at step 520. Note that the steps of controlling temperature by controlling current to the reference plate 111 and/or primary thermal plate 110, could alternatively be by controlling voltage so that a constant power setting is achieved for reference plate 111 and/or primary thermal plate 110.

Substantially concurrently with the continuous temperature testing process for the primary thermal plate 110 and the reference plate 111 defined above, the amount of current being drawn by the primary thermal plate 110 and the reference plate 111 are compared at step 530. As the winter precipitation 108 strikes the primary thermal plate 110, the winter precipitation substantially instantaneously melts and evaporates thereby cooling the first surface 112 of the primary thermal plate 110. The reference plate 111 is exposed to the same ambient environmental conditions as primary thermal plate 110 except for contact with any winter precipitation. Thus, the difference in the power consumption of the primary thermal plate 110 versus the reference plate 111 is directly proportional to the rate of winter precipitation falling on the primary thermal plate 110. Further, since the individual melting particles of the winter precipitation have a different power consumption curve than non-melting particles, winter precipitation types such as snow and drizzle can be distinguished by comparing the respective power consumption curves.

The power consumption by both the primary thermal plate 110 and the reference plate 111, and the difference in power consumption, is recorded with a time stamp in the sensor electronics housing 125 at step 537. At step 539 the time dated precipitation rate is calculated based on the difference in amps. At step 542, remote processor 140 periodically polls the local processor in the sensor electronics housing 125 to retrieve the precipitation data for further processing and recording along with the data from other snow gauge systems.

If the power consumption sensing and data recording is to continue at decision step 550, processing continues at step 530. If the power consumption sensing and data recording is not to continue at decision step 550, then processing quits at step 554.

Figure 6:
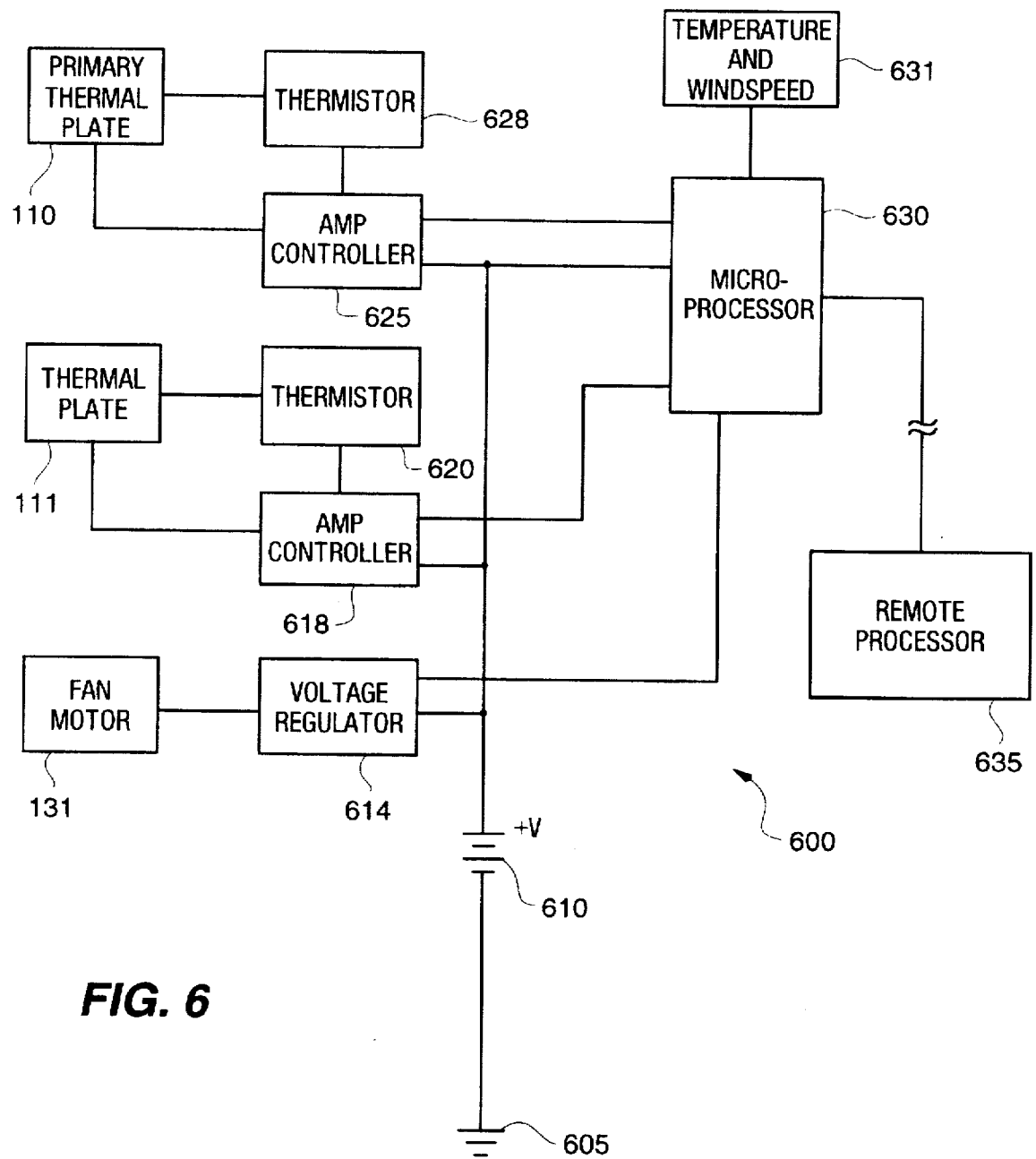
FIG. 6 illustrates control electronics for the winter precipitation measuring system in block diagram form.

Control Electronics—FIG. 6

FIG. 6 illustrates control electronics for the winter precipitation measuring system in block diagram form. The winter precipitation measuring system is powered by 110 V AC or in the alternative by 12 V DC for remote operations. In either case the voltage source 610 with appropriate grounding 605, provides power for the entire system.

Fan motor 131 is powered by way of a voltage regulator 614. Primary thermal plate 110 is connected in a loop with thermistor 628 to test temperature, and amp controller 625 to adjust the current to primary thermal plate 110 as needed. Microprocessor 630 compares, time stamps the data on current draw by the primary thermal plate 110, and transmits the data to a remote processor 635 for final precipitation rate calculations. Similarly, reference plate 111 is connected in a loop with thermistor 620 to test temperature, and amp controller 618 to adjust the current to reference plate 111 as needed. Microprocessor 630 compares and time stamps the data on current draw by the reference plate 111, and transmits the data to a remote processor 635 for final precipitation rate calculations.

SUMMARY

The winter precipitation measuring system of the present invention includes a method and apparatus for quantifying the precipitation rate of winter precipitation at a given point on the Earth's surface by way of an elongated tube, a thermal plate within the elongated tube, and a method and apparatus for maintaining the thermal plate at a substantially constant temperature and for determining a precipitation rate in response to maintaining the thermal plate at a substantially constant temperature. Although specific embodiments are disclosed herein, it is expected that persons skilled in the art can and will design alternative winter precipitation measuring systems that are within the scope of the following claims either literally or under the Doctrine of Equivalents.

What is claimed is:

1. A winter precipitation measuring system comprising:
    an elongated tube;
    a thermal plate within said elongated tube;
    means for maintaining said thermal plate at a substantially constant temperature;

means for quantifying a power consumption curve for a particle of winter precipitation that is in contact with said thermal plate;

means for distinguishing a first particle of winter precipitation from a second particle of winter precipitation in view of said power consumption curve for each respective particle; and means for determining a precipitation rate in response to said means for maintaining said thermal plate at said substantially constant temperature.

2. A system according to claim 1 wherein said means for maintaining includes:

means for sensing a temperature of said thermal plate; and means for adjusting an amount of power to said thermal plate in response to said means for sensing.

3. A system according to claim 1 wherein said means for determining includes:

means for quantifying an amount of power consumption to maintain said thermal plate at said substantially constant temperature; and means for converting said amount of power consumption into a precipitation rate.

4. A system according to claim 3 wherein said means for quantifying includes:

means for maintaining a reference plate at said substantially constant temperature wherein said reference plate is subject to ambient conditions affecting said thermal plate and said reference plate is protected from contact with winter precipitation; and means for quantifying a first amount of power required to maintain said thermal plate at said substantially constant temperature relative to a second amount of power required to maintain said reference plate at said substantially constant temperature.

5. A system according to claim 1 including:

means for preventing a heated plume from forming above said thermal plate.

6. A system according to claim 5 wherein said means for preventing includes:

means for drawing heated air away from around said thermal plate.

7. A method for operating a winter precipitation measuring system comprising:

mounting a thermal plate within an elongated tube;

maintaining said thermal plate at a substantially constant temperature;

quantifying a power consumption curve for a particle of winter precipitation that is in contact with said thermal plate;

distinguishing a first particle of winter precipitation from a second particle of winter precipitation in view of said power consumption curve for each respective particle; and determining a precipitation rate in response to said means for maintaining said thermal plate at said substantially constant temperature.

8. A method according to claim 7 wherein said step of maintaining includes:

sensing a temperature of said thermal plate; and adjusting an amount of power to said thermal plate in response to said step of sensing.

9. A method according to claim 7 wherein said step of determining includes:

quantifying an amount of power consumption to maintain said thermal plate at said substantially constant temperature; and converting said amount of power consumption into a precipitation rate.

10. A method according to claim 9 wherein said step of quantifying includes:

maintaining a reference plate at said substantially constant temperature wherein said reference plate is subject to ambient conditions affecting said thermal plate and said reference plate is protected from contact with winter precipitation; and quantifying a first amount of power required to maintain said thermal plate at said substantially constant temperature relative to a second amount of power required to maintain said reference plate at said substantially constant temperature.

11. A method according to claim 7 including:

preventing a heated plume from forming above said thermal plate.

12. A method according to claim 11 wherein said step of preventing includes:

drawing heated air away from around said thermal plate.

13. A winter precipitation measuring system comprising:

an elongated tube positioned to collect free falling winter precipitation;

a thermal plate within said elongated tube to have maximum surface area exposed to said winter precipitation;

a reference plate within said elongated tube, said reference plate being subject to substantially similar environmental conditions affecting said thermal plate while being protected from contact with said winter precipitation;

means for maintaining said reference plate at a substantially constant predetermined temperature;

means for maintaining said thermal plate at said substantially constant predetermined temperature;

means for quantifying an amount of power required to maintain said thermal plate at said substantially constant predetermined temperature; and means for determining a precipitation rate in view of said amount of power required to maintain said thermal plate at said substantially constant predetermined temperature.

14. A system according to claim 13 including:

means for preventing a heated plume from forming within and above said elongated tube.

15. A system according to claim 13 including:

means for distinguishing a first particle of winter precipitation from a second particle of winter precipitation in view of a power consumption curve for each respective particle.

16. A system according to claim 13 including:

means for viewing said frozen precipitation in contact with said thermal plate in real time from a remote location.

17. A system according to claim 13 including:

means for restricting air flow through said winter precipitation measuring system.

* * * * *